United States Patent [19]
Lupke et al.

[11] Patent Number: 4,587,874

[45] Date of Patent: May 13, 1986

[54] ROTARY PUNCH

[76] Inventors: Manfred A. A. Lupke, 10 McLeary Ct., Concord, Ontario, L4K 2Z3, Canada; Gerd P. H. Lupke, 597 Woodland Acres Ct., Maple, Ontario, Canada, L0J 1E0

[21] Appl. No.: 572,119

[22] Filed: Jan. 19, 1984

Related U.S. Application Data

[63] Continuation-in-part of Ser. No. 335,171, Dec. 28, 1981, abandoned.

[51] Int. Cl.[4] ........................ B23D 25/00; B26D 3/00; B26D 5/20; B23C 3/00

[52] U.S. Cl. ........................................ 83/340; 83/54; 83/278; 409/131

[58] Field of Search ...................... 83/54, 51, 39, 340, 83/278, 329; 409/131

[56] References Cited

U.S. PATENT DOCUMENTS

| | | | |
|---|---|---|---|
| 3,620,115 | 11/1971 | Zieg et al. | |
| 3,824,886 | 7/1974 | Hegler . | |
| 3,831,470 | 8/1974 | Maroschak | 83/54 |
| 3,877,831 | 4/1975 | Maroschak | 83/54 |
| 3,916,763 | 11/1975 | Maroschak | 83/54 |
| 4,180,357 | 12/1979 | Lupke et al. | 83/54 |

FOREIGN PATENT DOCUMENTS

| | | | |
|---|---|---|---|
| 2262231 | 7/1974 | Fed. Rep. of Germany | 409/131 |
| 1578566 | 8/1969 | France | 83/278 |

*Primary Examiner*—Paul A. Bell
*Assistant Examiner*—Paul M. Heyrana

[57] ABSTRACT

A pipe perforating apparatus has a spindle carrying a cutting tool and a drive for rotating the spindle about its own axis while revolving the spindle about the pipe. The cutter periodically engages and perforates the pipe. To provide for small, uniform sized holes in the pipe, the cutting tool is an end cutting punch and the spindle is rotated and revolved around the pipe to roll the punch into and out of the pipe without exerting a tangential force on the pipe.

9 Claims, 9 Drawing Figures

ROTARY PUNCH

CROSS REFERENCE TO RELATED APPLICATIONS

This application is a continuation-in-part of U.S. patent application Ser. No. 335,171 filed Dec. 28, 1981 now abandoned by Manfred A. A. Lupke and Gerd P. H. Lupke.

FIELD OF THE INVENTION

The present invention relates to the perforating of pipes and particularly to perforating corrugated thermoplastic pipes at spaced points. The perforated pipes are commonly used in underground drainage applications.

BACKGROUND OF THE INVENTION

It is known that the size and configuration of the holes in an underground soil drainage pipe can effect the performance of the pipe. For example, pipes with large holes are readily silted up if used in fine silt or sandy soils. Thus, a demand has arisen for different types of drainage pipes to be used under differing conditions. This has lead to a parallel demand for machinery capable of producing the various pipe hole configurations at high production speeds.

One known prior apparatus is described in U.S. Pat. No. 3,824,886 issued July 23, 1974 to Wilhelm Hegler. The apparatus disclosed in that patent includes a knife with a piercing point leading a concave cutting edge. In perforating a pipe, the piercing point moves into and through the pipe wall, the knife turns and the concave cutting edge moves tangentially through the pipe wall to cut a slot in it. The knife again turns to bring the piercing point through the pipe wall from the inside to the outside at the end of the slot. This piercing, slotting and severing action serves to chip a slot out of the pipe wall. To achieve the desired motion of the knife, it is mounted on a carrier that rotates about its own axis and revolves about the pipe. The rotation and revolution are so related that the leading end of the knife follows a path in the shape of an epitrochoid and chips slots from the pipe as it travels through nodes of the epitrochoid.

In another slot cutter described in the applicants'U.S. Pat. No. 4,180,357 issued Dec. 25, 1979, the knives are mounted on rotary but otherwise fixed spindles.

In all such slotters, the slot size is difficult to control as it varies widely with relatively small changes in other parameters such as the pipe wall thickness, knife adjustment and knife sharpness. This variance results primarily from the tapering of the ends of the slot as described, for example, in the Hegler Patent referred to above. Consequently, to provide for a more uniform opening size and a smaller opening size than is possible with a slot cutter, other types of machine have been developed which use a punching action in which a tool with a cutting end is driven radially through the pipe wall to form a perforation that is of substantially the same size and shape as the punching tool. Typical machines are described in Zieg et al U.S. Pat. No. 3,620,115 issued Nov. 16, 1971 and in Leloux German Pat. No. 2,652,169 of Oct. 2, 1980. While these punching type of perforators can produce holes of controlled size and shape, they require either an intermittent stopping of the pipe advance during the punching action or a complex mechanism to move the punching tool axially with the pipe as it is driven radially through the pipe wall.

SUMMARY OF THE INVENTION

The object of the present invention is to provide a relatively simple punching apparatus that can produce substantially uniform perforations of controlled size and configuration at high speed and with continuous pipe feed.

According to the invention, this is accomplished by mounting a punch with a piercing end on a spindle that, like the knife carrier in the Hegler slotter, rotates about its own axis and revolves about the pipe, but wherein the relative speeds of the rotation and revolution are controlled to drive the punch around the pipe in what is substantially an epicycloid rather than the epitrochoid required for the slotting type cutter of Hegler. With this arrangement, the punch perforates the pipe substantially radially even though the action of the apparatus is purely rotary.

To ensure proper registration of the punch with corrugations in the pipe wall, and to drive the pipe through the apparatus, the spindle may be equipped with a helical rib matching the pipe corrugations in pitch. Where the punch is to act at the roots of the corrugations, the punch will project from a base surface of the spindle at the crown of the rib. To perforate the crests of the corrugations in the pipe, the comparable base surface is at the root of the rib. To provide for the desired path, a drive means is provided for rotating the spindle about its axis and revolving the spindle about the pipe while maintaining the ratio $W/W2 = A/B$. $W1$ is the angular speed of rotation of the spindle about its axis, while $W2$ is the angular speed of revolution of the sindle about the pipe. A is the outside radius of the pipe where it contacts the base surface of the spindle and B is the radius of the base surface of the spindle.

BRIEF DESCRIPTION OF THE DRAWINGS

In the accompanying drawings, which illustrate exemplary embodiments of the present invention.

DETAILED DESCRIPTION

Figure 1:
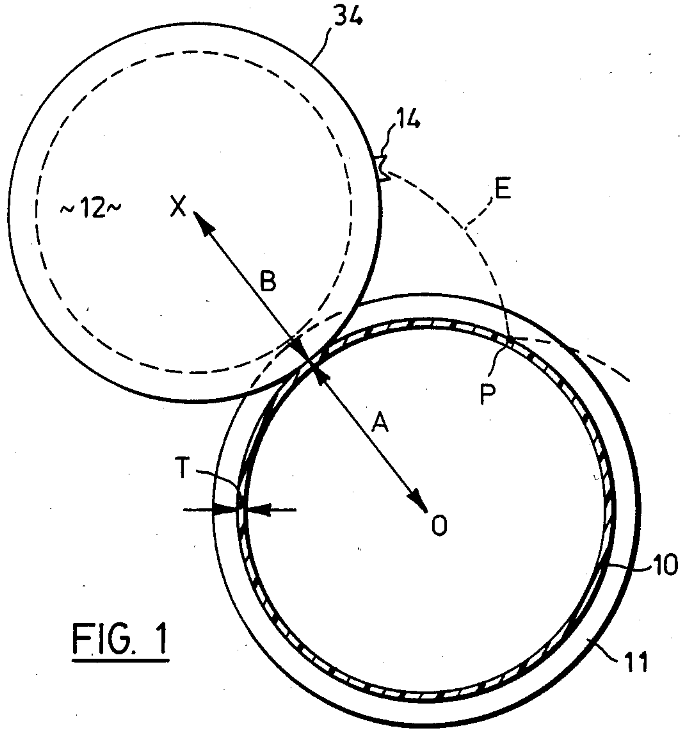
FIG. 1 is a schematic illustration showing the position of a punch on a carrier and a portion of the path of the punch with respect to a pipe to be perforated.

Referring to the drawings, FIG. 1 illustrates a cross section of a pipe 10 with a central axis O. The pipe 10 is corrugated, having a wall thickness T in the troughs between the crests 11. The external radius of the pipe at the troughs is A.

A cutter for perforating the tube includes a tool carrier in the form of a cylindrical spindle 12 with a portion of radius B tangential to the pipe 10 at the base of the illustrated trough. A punch 14 is mounted on the spindle and projects radially from the portion of radius B by a distance slightly greater than the pipe wall thickness T. The spindle 12 rotates about its axis X causing the punch 14 to rotate about the axis X. The spindle is in turn caused to revolve in a circular path about the central axis O of the tube. The ratio of the angular velocity of the spindle about axis X to the angular velocity of axis X about axis O is A:B. This means that the portion of the spindle 12 of Radius B rolls about the pipe 10 without slip and a point Q where the punch meets the surface of the spindle is caused to follow an epicycloidal path E having a cusp which touches the surface of the pipe at point P. At the point P, the punch 14 penetrates the wall of the pipe 10 to form an aperture. The penetration is substantially radial so that there is no tangential force exerted on the pipe.

In the embodiment schematically illustrated in FIG. 1, the radii A and B are equal so that the angular velocities of the punch 14 about axis X and of axis X about axis O are equal. The epicycloidal path E is a cardoid with a single cusp. In other embodiments, the radii A and B may not be equal. They are preferably in a simple whole number ratio e.g. 1:2, 2:1 or 3:1. In any event, even if thr radii A and B are not in a simple whole number ratio, the angular velocities are in the ratio A:B to produce the desired epicycloidal path.

In FIG. 1, a single spindle with a single punch is shown for simplicity of illustration. In the apparatus illustrated in FIGS. 2 and 3, three spindles, each with a single punch, are disposed symetrically about the tube. In other embodiments, other numbers of spindles or punches may be employed.

Figure 2:
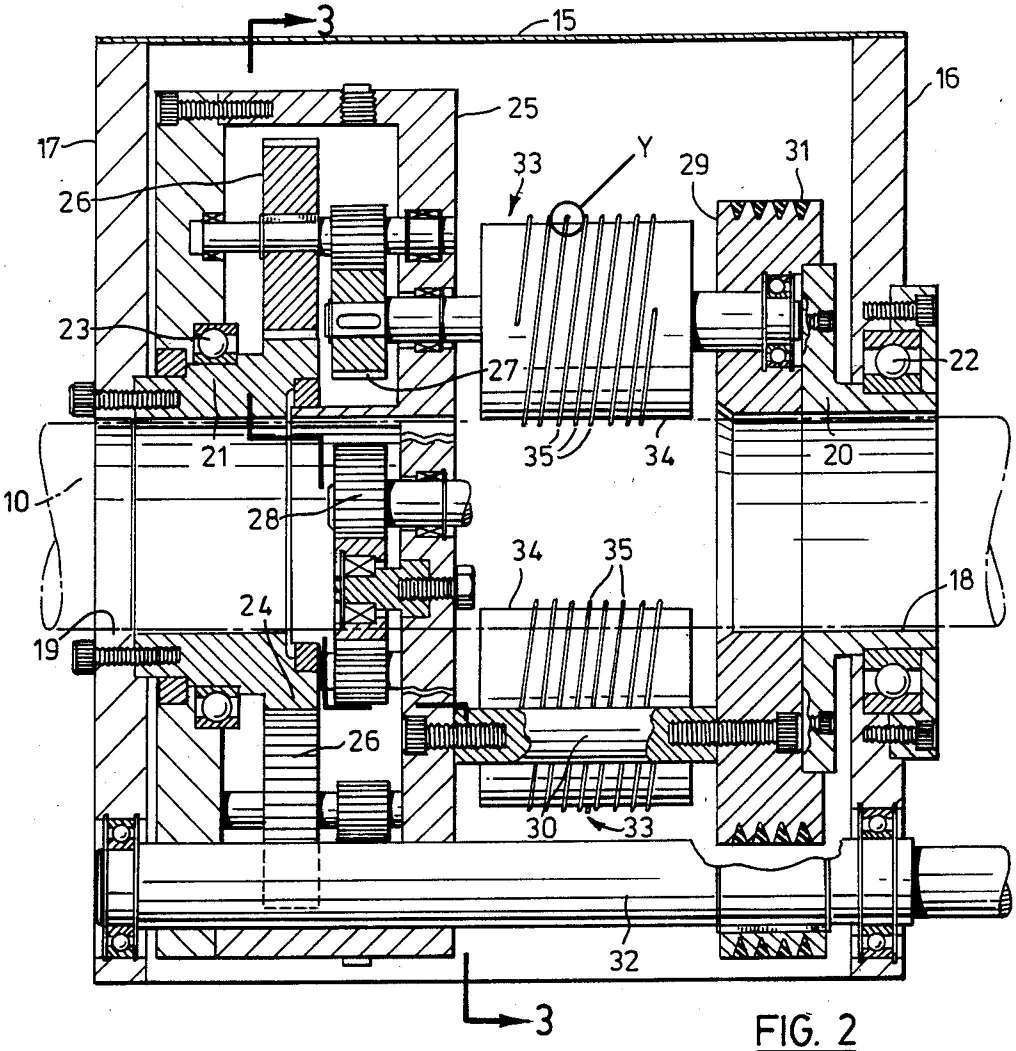
FIG. 2 is a sectional side elevation, taken on line 2—2 in FIG. 3 of an apparatus for perforating corrugated pipe.
Figure 3:
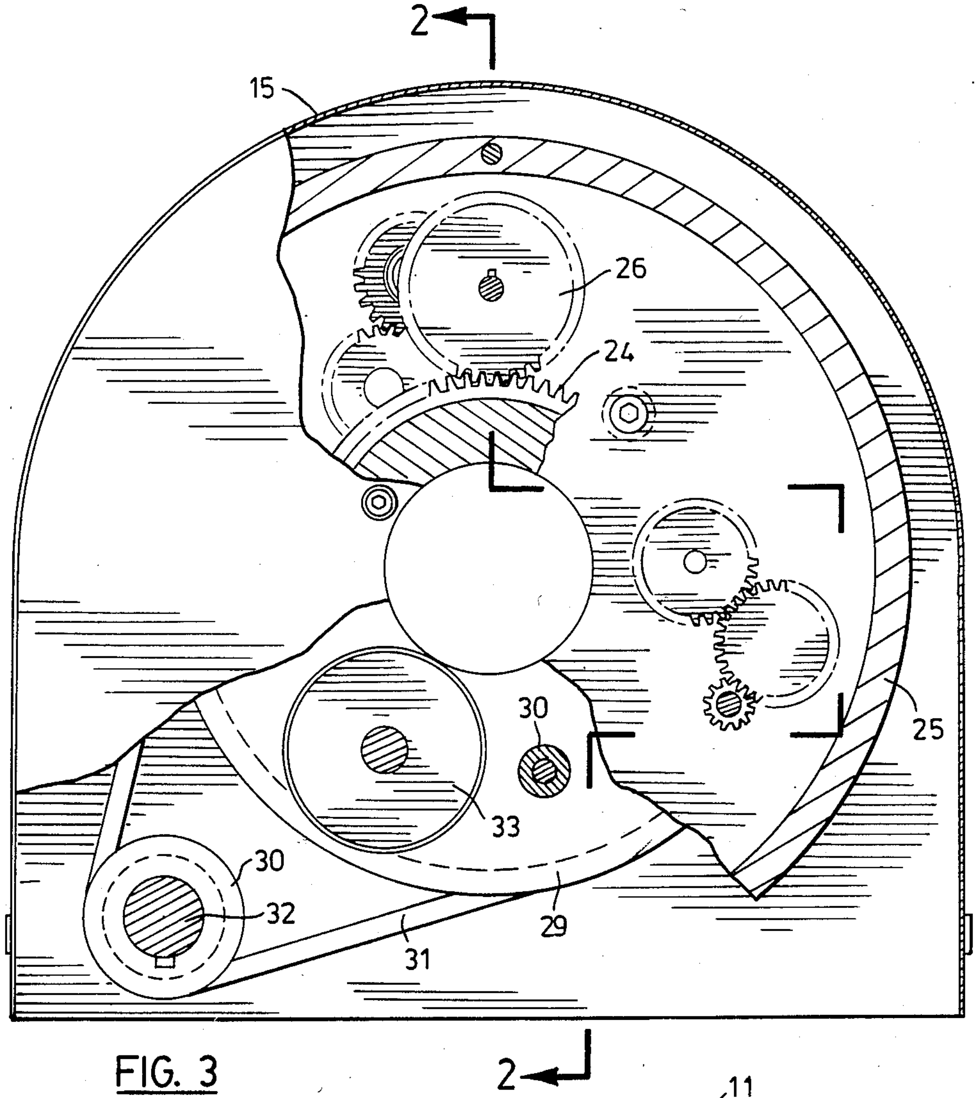
FIG. 3 is a section on line 3—3 in FIG. 2.

Referring more specifically to FIGS. 2 and 3, the apparatus illustrated includes a housing 15 with end walls 16 and 17. End wall 17 has a central circular opening 19 for receiving a pipe to be perforated. The end wall 16 has a larger circular opening that is aligned with the opening 19 and has a counterbore on the outside. A ball bearing 22 is fitted into the counterbore and is retained in position by an end cover **22*a*. The bearing 22 carries the cylindrical sleeve of an adaptor 20. The adaptor 20 also has a circular flange fastened to the side face of a sheave 29 by cap screws 29*a*. The adaptor 20 and sheave 29 have a through bore 18 that is the same size as the opening 19 in end wall 17 and aligns with that opening so that a pipe 10 may pass into and out of the apparatus through the openings 18 and 19**.

A stationary ring gear 21 is secured to the inside face of wall 17 by bolts **21*a*. The gear is aligned with the opening 19 so that the pipe 10 can pass through the gear. The hub of the gear 21 carries a ball bearing 23, which in turn supports a gear housing 25. The housing is sealed to the gear 21 by seals 25*a* and 25*b***.

The gear housing 25 carries three shafts **26*a* parallel to the gear 21. A pinion 26 is keyed to each of the shafts 26*a* and meshes with the teeth 24 of the ring gear 21. Each shaft 26*a* also carries a gear 26*b*. Three idler gears 28 carried by the housing 25 mesh with the gears 26*b***.

Three drive bars 30 (one shown) extend between the gear housing 25 and the sheave 29. The bars are secured to both the housing and the sheave so that these parts rotate as a unit.

Also extending between the gear housing 25 and the sheave 29 are three spindles 33. At one end each spindle shaft extends into the gear housing 25 and is keyed to a gear 27 meshing with a respective one of the idlers at 28. The other end of the spindle shaft is mounted on the sheave 29 by ball bearing 33A.

Between the gear housing 25 and sheave 29 each of the spindles 33 has an enlarged cylindrical section 34. This section 34 carries a helical rib 35 on its outer surface and a punch at the location indicated by the circle Y. The punch will be described in more detail in connection with FIGS. 4 and 5.

A drive shaft 32 extends through the housing 15, parallel to the pipe 10. It is mounted in bearings **32*a* and 32*b* in the end walls 16 and 17 respectively. The shaft 32 carries sheave 42 aligned with sheave 29. Sheave 42 drives sheave 29 through a series of V belts 31**.

Figure 4:
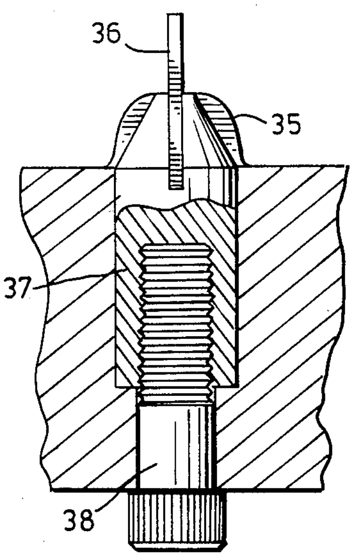
FIGS. 4 and 5, located on the same sheet as FIG. 1, are front and side views, partly in section, of a punch mounted on a carrier.
Figure 5:
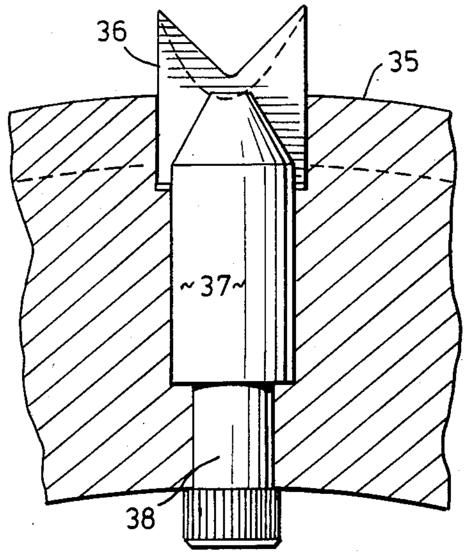
Figure 7:
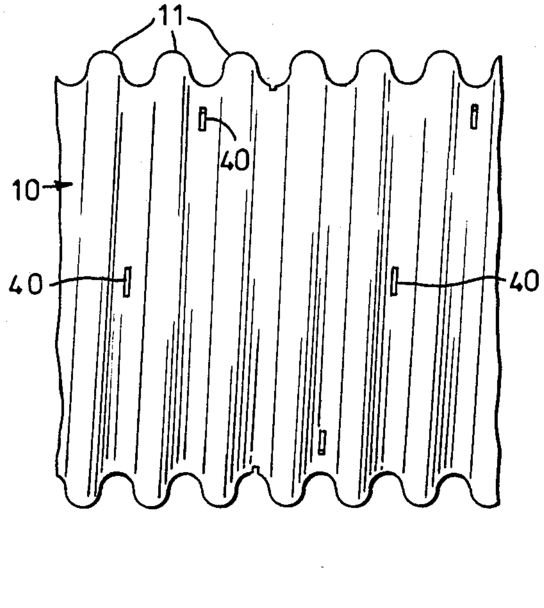
FIG. 7, located on the same sheet as FIG. 2, illustrates a length of corrugated pipe after being perforated by punches like those shown in FIGS. 4 and 5.
Figure 6:
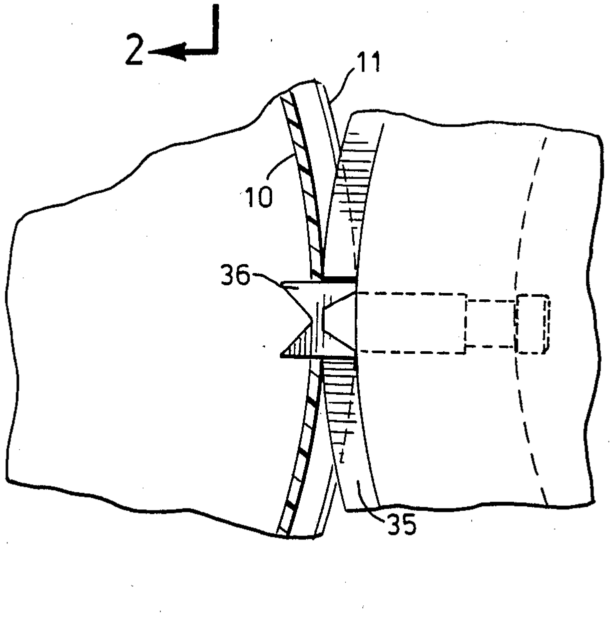
FIG. 6, located on the same sheet as FIG. 3, is a partly sectional schematic showing the punch of FIGS. 4 and 5 as it perforates the wall of a pipe.

As mentioned above, the punch is more clearly illustrated in FIGS. 4 and 5. As illustrated in those figures, the body 34 of the spindle 33 has a stepped bore **37*a* aligned with the rib 35. A cylindrical body 37 of the punch fits into the bore 37*a* and is held in place by a cap screw 38 extending into the bore 37*a* from the opposite side and threaded into a bore in the inner end of body 37. The punch has a cutting head 36 with a V-shaped cutting edge along the end facing radially away from the axis of the spindle. The cutting edge serves for punching short rectangular slots in the pipe. The punch is shown in FIG. 6 engaged with the wall of the pipe 10 and piercing the pipe in the desired manner. FIG. 7 illustrates a helically corrugated pipe 10 with slots 40** produced by the punch.

In operation of the apparatus, the drive shaft 32 is driven from an external power source of any appropriate sort. This drives the sheave 40, the belts 31 and sheave 29. Rotation of sheave 29 acts through drive bars 30 to rotate the gear housing 25. As the sheave 29 and gear housing 25 rotate, the spindles 33 are revolved about the pipe 10 extending through the housing. The gear train consisting of stationary gear 21, pinions 26 and **26*b*, idlers 28 and gears 27 rotate the spindles 33 about their respective axes. Appropriate selection of the gear ratios insures that the ribs 35 of the spindles 33 will roll on the surface of the pipe 10** without slipping, so that the punches will progress around the pipe in epicycloidal paths.

The helical ribs 35 on the spindles 33 engage the corrugations of the corrugated pipe to advance the tube through the cutter. With a pipe having helical corrugations such as that shown in FIG. 7, the ribs 35 may be annular rather than helical. Helical ribs are required for a pipe with annular corrugations.

Figure 8:
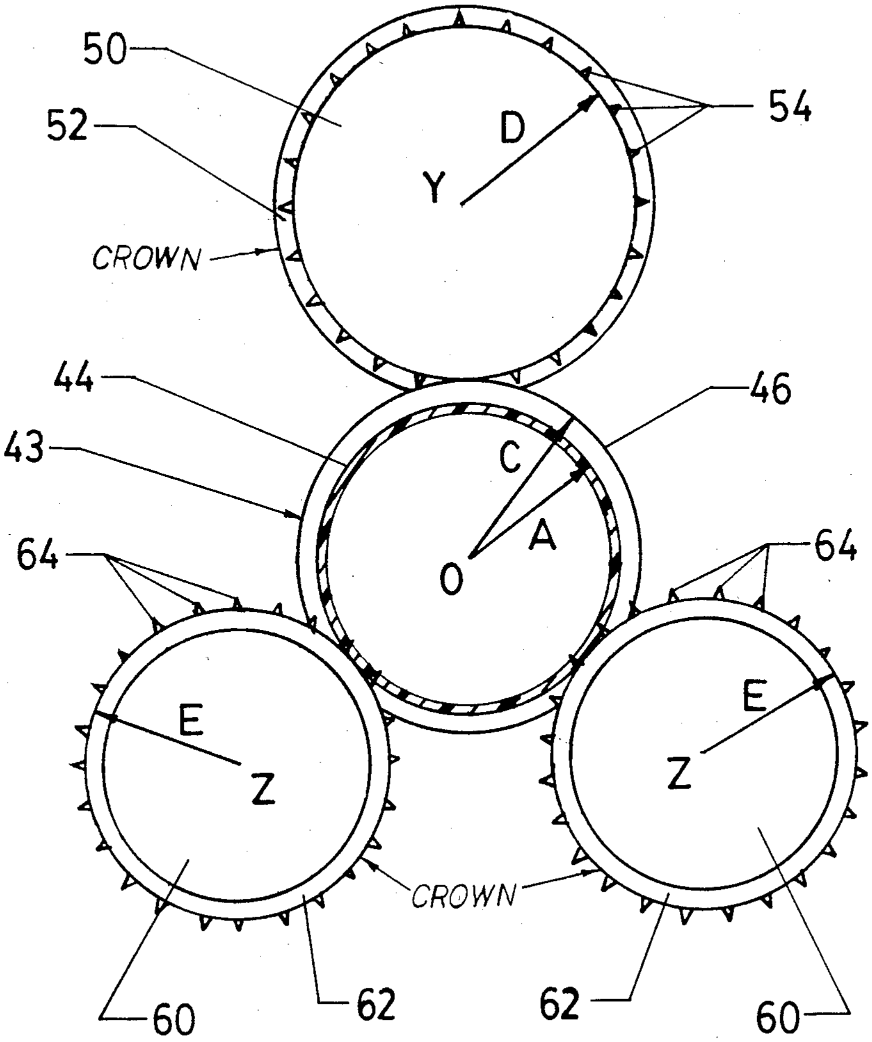
FIG. 8 is a schematic illustration of another embodiment of the apparatus for producing a filter pipe.
Figure 9:
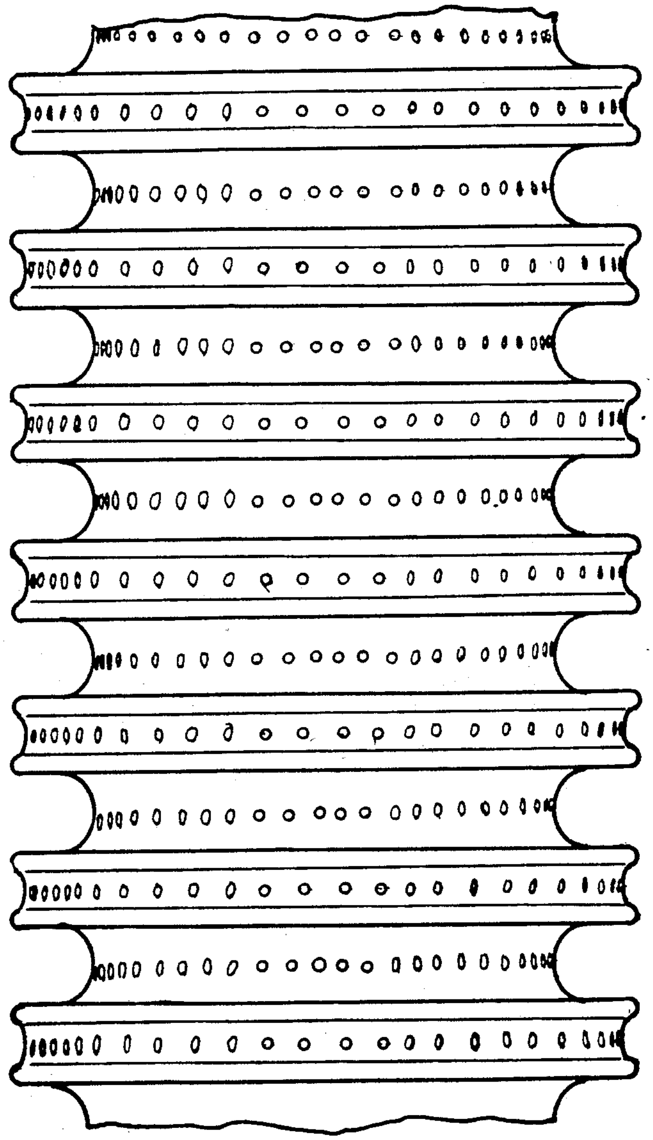
FIG. 9 is an elevation of a filter pipe produced by the apparatus of FIG. 8.

FIG. 8 illustrates an embodiment of the apparatus for punching a large number of very small holes in the wall of a thermoplastic pipe with a double corrugation as illustrated in FIG. 9. The pipe 43 shown in FIG. 9 has primary troughs 44 separated by annular crowns 46. Each crown 46 is in turn formed with a small annular secondary trough 48. A row of small drain holes is formed along the root of each primary and secondary trough to form a "filter pipe" that is useful for drainage purposes in fine or sandy soils.

Referring to FIG. 8, the illustrated pipe is shown as having an outside radius A at the base of the primary trough and an outside radius C at the base of the secondary trough. The secondary trough is quite shallow and for the sake of clarity, has been shown as though it was flat rather than concave.

A spindle 50 has a helical rib 52 meshing with the primary trough 44 of the pipe 43. The spindle has an axis Y parallel to the axis O of the pipe 43. The spindle has a base surface of radius D at the root of the rib 52. The radius D is equal to the pipe radius C. Small pin-like punches 54 are uniformly spaced around the spindle 50.

The punches project radially from the base surface of the spindle between adjacent turns of the rib 52. In FIG. 8, one row of punches is illustrated. Other rows, with the punches offset angularly from those illustrated, may be included in preceding or following sections of the spindle. This use of plural staggered rows of punches provides for a large number of very closely spaced holes in the pipe while maintaining sufficient space between adjacent punches on the spindle to allow for installation and service.

Two smaller diameter spindles 60 have axes Z that are parallel to the pipe 43. Each spindle 60 has a helical rib 62 that extends into the primary trough 44 of the pipe 43 and engages the base of the trough. The base surface of each spindle 60 is at the crown of the rib and has a radius E equal to the outside radius A of the pipe 43 at the base of the primary trough. Pin-like punches 64 project radially from the rib 62 and are spaced along one or more turns of the rib. Where more than one turn is equipped with punches, the punches in adjacent turns are offset angularly from one another to provide a uniform distribution of punches around the spindle. The two spindles 60 are so oriented angularly about the axis Z that the punches of one will perforate the pipe between the perforations produced by the punches of the other. This adjustment is readily made through adjustment of the engagement between the idler 28 and the pinion 27 (FIG. 2).

In operation, the three spindles revolve about the pipe 43, rotating about their individual axes at the same angular speed. Because the radius D of the base surface of the spindle 50 equals the pipe radius C, the spindle rolls on the crowns 46 of the corrugations without tangential slip. The punches 54 roll into and out of the base of each secondary trough to produce a series of small drain holes as illustrated in FIG. 9. Similarly, the ribs 62 of spindles 60 roll on the bases of pipe primary troughs 44 without slip. The punches 64 roll into the pipe to produce a series of small diameter holes spaced along the base of the trough.

While particular embodiments of the invention have been described in the foregoing, it is to be understood that other embodiments are possible within the scope of the present invention. The invention is to be construed as limited only by the apended claims.

We claim:

1. In a pipe perforating apparatus of the type comprising a spindle having an axis of rotation and a substantially cylindrical base surface concentric with the axis, a cutting tool mounted on the spindle and projecting from the base surface, and drive means for rotating the spindle about its axis of rotation and simultaneously revolving the spindle about the pipe whereby the cutting tool periodically engages and perforates the pipe, the improvement wherein:

the cutting tool is a punch with a piercing end adapted to punch an aperture in the pipe, substantially radially thereof;

the punch is mounted on the spindle with the piercing end facing radially away from the spindle axis and spaced from the base surface a distance only slightly greater than the thickness of a pipe to be perforated;

the drive means is constructed to rotate the spindle about its axis and revolve the spindle about the pipe while maintaining the relationship;

$$W1/W2=A/B$$

where

W1 is the angular speed of rotation of the spindle about its axis,

W2 is the angular speed of revolution of the spindle about the pipe,

A is the outside radius of the pipe where it contacts the base surface of the spindle and B is the radius of the base surface of the spindle; whereby each point on the base surface of the spindle travels about the pipe in an epicycloid and the punch is driven into and drawn out of the pipe substantially radially, substantially without tangential movement relative to the pipe.

2. An apparatus according to claim 1 wherein the ratio of W1/W2 is an integer.

3. An apparatus according to claim 1 wherein the spindle carries a helical rib and the base surface is defined by the crown of the rib.

4. An apparatus according to claim 1 wherein the spindle carries a helical rib and the base surface is defined by the root of the rib.

5. An apparatus according to claim 1 wherein the spindle carries annular ribs and the base surface is defined by the crowns of the ribs.

6. Apparatus according to claim 1 wherein the spindle carries annular ribs and the base surface is defined by the roots of the ribs.

7. Apparatus according to claim 1 including a plurality of spindles each carrying a plurality of punches.

8. Apparatus according to claim 7 wherein each spindle carries a helical rib.

9. Apparatus according to claim 8 wherein the base surface of at least one spindle is at the crown of the rib and the base surface of at least one other spindle is at the root of the rib.

* * * * *